COMPUTER HAVING FLOATING POINT MULTIPLICATION

Original Filed Oct. 1, 1962 13 Sheets-Sheet 1

INVENTOR.
THEODORE M. HERTZ
BY L. Lee Humphries
ATTORNEY

COMPUTER HAVING FLOATING POINT MULTIPLICATION

Original Filed Oct. 1, 1962 13 Sheets-Sheet 2

INVENTOR.
THEODORE M. HERTZ
BY L. Lee Humphries
ATTORNEY

Feb. 14, 1967 T. M. HERTZ 3,304,417

COMPUTER HAVING FLOATING POINT MULTIPLICATION

Original Filed Oct. 1, 1962 13 Sheets-Sheet 3

INVENTOR.
THEODORE M. HERTZ

BY L. Lee Humphries

ATTORNEY

INVENTOR.
THEODORE M. HERTZ
BY L. Lee Humphries
ATTORNEY

Feb. 14, 1967 T. M. HERTZ 3,304,417

COMPUTER HAVING FLOATING POINT MULTIPLICATION

Original Filed Oct. 1, 1962 13 Sheets-Sheet 5

| | | |
|---|---|---|
| 00 | ICH | Input number of characters from device specified |
| 01 | OCH | Output number of characters from device specified |
| 02 | ALS | Shift number in A register left by amount specified |
| 02.2 | ASV | Same as 02 with overflow indication of 1 lost |
| 02.4 | ASC | Same as 02 with normalizing - optional termination |
| 03 | ARS | Shift A register right by amount specified |
| 05 | STR | Store number in R register in address specified |
| 10 | TIX | Transfer to new location count if index ≠ 0, decrement |
| 11 | TNZ | Transfer if number in A register is not equal to zero |
| 12 | SAP | Set sign of A register positive |
| 12.4 | SAN | Set sign of A register negative |
| 13 | CSA | Change sign of the A register |
| 15 | TLB | Transfer if the least significant bit of A is a one |
| 16 | CAZ | Clear A register to plus zero |
| 16.4 | CMZ | Clear A register to minus zero |
| 17 | CMP | One's complement A register bits, including sign |
| 17.4 | RND | Round A register number if most significant R bit is 1 |
| 25.1 | STI | Store index in right hand address portion specified |
| 31.1 | LDI | Read index from right hand portion of address to G41 |
| 35 | CMG | Compare, set Jo true for B A, false for B = A * |
| 35.4 | CME | Compare, set Jo true for B A or B A, false for B = A |
| 36 | CLS | Clear A register and subtract addressed operand |
| 37 | CLA | Clear A register and add addressed operand thereto |
| 40 | CTL | Copy from address specified to L loop to end of loop |
| 41 | CTV | Copy from address specified to V loop to end of loop |
| 42 | LLS | Long left shift A and R registers by amount specified |
| 42.2 | LSV | Same as 42 with overflow for loss of a 1 by shift |
| 42.4 | LSC | Same as 42 with normalizing - optional termination |
| 43 | LRS | Long right shift of A and R registers |
| 44 | CFL | Copy from L loop to Main memory starting at address |
| 45 | STO | Store number in A register in address specified |
| 50 | TZE | Transfer if number in A register is zero |
| 51 | TRA | Transfer unconditionally |
| 52 | TOV | Transfer on overflow (no halt if overflow) |
| 53 | TMI | Transfer if A register sign is negative |
| 54 | NOP | No operation |
| 55 | TPL | Transfer if A register sign is positive |
| 56 | XAR | Interchange A and R registers |
| 57 | CAR | Copy A register into the R register, clear A |
| 63 | MPY | Multiply A number by operand in address specified |
| 65 | STA | Store address in A register in address specified |
| 66 | DIV | Divide A number by operand in address specified |
| 70 | EXT | Logical multiplication of A number by operand specified |
| 71 | HTR | Halt and transfer unconditionally |
| 72 | SUB | Subtract operand specified from A register number |
| 73 | ADD | Add operand specified to A register number |
| 76 | RCS | Clear and subtract (Copy A to R) |
| 77 | RCA | Clear and Add (Copy A to R) |
| 23 | FMP | Floating Multiply |
| 26 | FDV | Floating Divide |
| 74 | FSB | Floating Subtract |
| 75 | FAD | Floating Add |

* Assume overflow was off; if overflow was on initially then if B = A 0, do nothing; if B = A 0, reverse Jo

FIG. 5

INVENTOR.
THEODORE M. HERTZ
BY L. Lee Humphries
ATTORNEY

Feb. 14, 1967 T. M. HERTZ 3,304,417

COMPUTER HAVING FLOATING POINT MULTIPLICATION

Original Filed Oct. 1, 1962 13 Sheets-Sheet 6

InDo (1WT)

FLOATING MULTIPLY MODE

1. Floating multiply operation code 23 is set in the D register

1Fm = $\underline{\text{N11}}$ D6'D4'D2
   $\underline{\text{N11}}$ = $\overline{\text{I2I1}}$DoT41

2. Multiplier operand initially in the A register

Multiplicand operand copied into the B register

3. A count of "32" is set up in the G register

1g41 = Do Kg D6' $\overline{\text{T20}}$ (or $\overline{\text{T40}}$)
   Og41 = Do Kg P5P3$\overline{\text{P2T15}}$ (or $\overline{\text{T35}}$)

4. Fixed point multiply operation 63 is forced into InDo mode at T41 time

1d6 = $\overline{\text{N11}}$ D4'D3'
   1i3a = $\overline{\text{N11}}$ D2
   $\underline{\text{M1}}$ = $\overline{\text{I3a}}$ D5 D4' D3'

FIG. 6

Nz (1WT)

FLOATING MULTIPLY MODE

1. If normalizing is required

1nz = Fm G1 Kg $\overline{\text{T20}}$ D3'
   Od5 = NzT41 (Long left shift)
   Od4 = NzT41 (Long left shift)
   1d3 = NzT41 (Long left shift)
   Od1 = NzT41 (Long left shift)
   $\underline{\text{MsL}}$ = D4' D3 I3a C4'

2. The most significant bit of the R register is copied into the least significant bit position of the A register 1a41 = S $\underline{\text{MsL}}$ T1' Do'
   1s = $\overline{\text{R10}}$ Ka' I3a
   Oka = $\overline{\text{I3a}}$ T41
   Or1 = I3a D5 T40 D6 (Reset initially)

3. Exponent is decremented by one for each bit left shift of the fraction operand during normalizing 1d5 = Nz$\overline{\text{T33}}$
   1d4 = Nz$\overline{\text{T33}}$
   Od3 = Nz$\overline{\text{T33}}$

FIG. 9

INVENTOR.
THEODORE M. HERTZ
BY
L. Lee Humphries
ATTORNEY

FIG. 7

U1 (1WT)

FLOATING MULTIPLY MODE

1. Multiplier operand bits are shifted right into the R register from the A register 1r41 = A2 M1 I2 (one bit right shift)
   Or41 = A2' M1 I2 T41'
   1r40 = R41 Do' T41'
   1r1 = R2 M1 T41

2. Clear A register to all zeros

Oa41 = I4' T1 Fa'
   Oa40 = A41' I2
   Oa39 = A40' Fm I2 T1'

3. Multiplicand operand in B register is recirculated during bit times T1 through T32

1b41 = B1I3a D2
   Ob41 = B1' I3aD2
   1b40 = B41 D5 D4'
   Ob40 = B41' D4'

4. Exponent bias bit A40 is inverted at T1 time and copied directly at T1' time

1a39 = A40'Fm I2 I1' T1 (Invert bias)
   + A40 Fm I2 T1' (Copy directly)

5. The algebraic sign of the product is determined and stored

1c2 = U1 T1 D2 (set at first bit time of U1)
   Oc2 = U1 D5 D4' D2 A40 B40' T2 + Fm I2 T2 A40' C5
   where U1 is the 1st word time of floating multiply mode
   1c5 = I3a B41 T1 D5
   Oc5 = I3a B41' T1 D5
   1a41 = C2 I3a K41
   Oa41 = C2' I3a K41
   K41 = Kc T41

1r41 = C2 Msd K41
   Or41 = C2' Msd K41
   Msd = D6 D4' D3' D1 I3a

6. Exponents are added using fixed point add logic and sum is rewritten into the B register 1r1 = Fm I2 T32
   Or1 = I3aD5T40D6
   Mo = I3a D5 D4 D3'
   1d4 = Fm T33 I2
   1b40 = SMo I2

7. Overflow or underflow of exponent addition is detected

1jo = Kc'Fm R1 D1 A1' B1 Ka T40 (Overflow)
   + Kc' Fm R1 D1 A1 B1' Ka' T40 (Underflow)

8. Operation code forced back to fixed point multiply (63)

Od4 = FmT41
   M1 = I3a D5 D4' D3'

Terminate mode if either the multiplier or multiplicand operand is zero

1kc = Fm I2 B1' T32 Fm I2 A1' T32 D3'

INVENTOR.
THEODORE M. HERTZ
BY L. Lee Humphries
ATTORNEY

Ui (31 WT)

FLOATING MULTIPLY MODE

1. Multiplicand operand multiplied by multiplier operand using fixed point multiplication 1r1 = R2 Fm D3' Nz' T41 (Simple adder)
   0r1 = I3a D5 T40 D6 (Sum flip flop "S" copies "A" directly)
   1a39 = S Msr Ui T1' (Sum is rewritten back into the A register)
   Msr = D4' D3' D1 I3a I2'

2. Precessing of product of multiplication into the A register is stopped and fixed point addition is forced into the computer to terminate the multiply operation 1d4 = FmT33D3'
   0d4 = Fm T41 (reset during Ui)

3. B register is recirculated to preserve contents (exponent)

1b40 = B41 Mo I2'
   0b40 = B41' Mo I2'

4. Exponent is copied from B register into the A register

1a40 = B41 Fm D4 D1 Do' I2'
   0a40 = B41' Fm D4 D1 Do'

5. Product is checked for normalizing

1c1 = Fm D3' Ka' T33 (Not normalized)
   0c1 = M1 T1 (Normalized)
   1kc = G1 Kg T20 I3a C1' Fa'
   0kc = Fm C1 I2' T1'

FIG. 8

INVENTOR.
THEODORE M. HERTZ
BY L. Lee Humphries
ATTORNEY

COMPUTER HAVING FLOATING POINT MULTIPLICATION

Original Filed Oct. 1, 1962 13 Sheets-Sheet 9

INVENTOR.
THEODORE M. HERTZ
BY L. Lee Humphries
ATTORNEY

Feb. 14, 1967 T. M. HERTZ 3,304,417

COMPUTER HAVING FLOATING POINT MULTIPLICATION

Original Filed Oct. 1, 1962 13 Sheets-Sheet 10

INVENTOR.
THEODORE M. HERTZ
BY L. Lee Humphries
ATTORNEY

INVENTOR.
THEODORE M. HERTZ
BY L. Lee Humphries
ATTORNEY

INVENTOR.
THEODORE M. HERTZ
BY L. Lee Humphries
ATTORNEY

INVENTOR.
THEODORE M. HERTZ
BY L. Lee Humphries
ATTORNEY 3,304,417

COMPUTER HAVING FLOATING POINT MULTIPLICATION

Theodore M. Hertz, Whittier, Calif., assignor to North American Aviation, Inc.

Continuation of application Ser. No. 227,365, Oct. 1, 1962. This application May 23, 1966, Ser. No. 552,341
8 Claims. (Cl. 235—164)

This application is a continuation of application Serial No. 227,365, filed October 1, 1962, and now abandoned.

This invention relates to electronic digital computers and more particularly to a computer having floating point multiplication capabilities.

Prior art digital computers utilized fixed point arithmetic processes in executing computer operations. In performing fixed point arithmetic processes a computer assumes the binary point (analogous to a decimal point) to be between the sign of a number and the most significant digit of the number. Thus the number is considered to have an absolute value of less than one. As explained in patent application filed September 24, 1962, Serial No. 225,676, now abandoned, for a "Computer Having Floating Point Addition and Floating Point Subtraction" invented by me, in order to execute fixed point addition and subtraction operations, numbers to be operated upon by a computer must first be appropriately scaled prior to computation in order to obtain meaningful results. The scaling of the numbers is accomplished prior to entering them into the computer or by shifting them through programming afterwards. Fixed point multiplication needs to have numbers scale prior to performing computations with them. In multiplication, shifting of the result through programming is desirable in order to prevent loss of significant portions which should be retained for use in later computations. Particularly is it true where after a multiplication operation has been performed, the product must be added or subtracted from or with other numbers, in which case scaling would first have to be done before the additional computation could be made.

In order to overcome the limitations above, a system has been devised whereby numbers are automtically scaled inside the computer. This system is called herein a floating point arithmetic process. In the floating point format, a word may be divided into a sign bit, a characteristic, and a mantissa. The characteristic is the exponent to which the base number 2 is raised. The mantissa is expressed as binary fraction, as a number less than one. In order to determine the numerical value indicated by the characteristic and mantissa, the base number 2 must first be raised to the value of the characteristic, and the results of that operation must then be multiplied by the fraction represented by the mantissa.

In floating point multiplication the multiplier operand, designated by an exponent portion and a fraction portion, is initially transferred to a first register. The multiplicand is similarly transferred to a second register. A counter, or third register, is set up so that the multiplation operation can be terminated at a proper time. The multiplier fraction is transferred to a fourth register and the exponents of both the multiplier and multiplicand operands are added using ordinary fixed point adder logic. The sum of the exponents is then transferred to the second register so that the second register contains the multiplicand fraction and the combined or added exponents. Logic is included for terminating the operation of either of the fraction is found to be zero.

When multiplying numbers having large exponents, an overflow my occur. When multiplying two numbers having very small exponents, an exponent underflow may occur. In both cases the overflow indicator is turned on to enable a programmer to take appropriate correcting action.

The fractional portions of the operands in the registers are multiplied using fixed point multiplication logic. However the fractions are smaller in number of bits than the fixed point fractions by virtue of having had the portion of the number designated by the characteristic or exponent removed. At the end of the operation of multiplying the fractions, both the product and the exponent are transferred to the first register as a final product. If the result is not already in a normalized form, the fractional portion of the result is normalized by shifting it left and in order that the numerical value of the number remain the same, the new exponent is decremented by one for each bit the fractional portion is shifted left. The term de-normalization is the opposite of normalizing wherein the number is shifted left until a binary one appears in the most significant bit position of the register. In de-normalization the numbers in a particular register are shifted right a predetermined number of bit positions, usually to align the operand in one register with an operand in another register or to avoid overflow. The exponent portion of the numerical value involved is incremented by one for each bit of right shifting by addition. In either case, normalization or de-normalization, it can thus be seen that the value of the number remains the same.

It is therefore an object of this invention to provide a computer having simplified floating point multiplication.

It is still another object of this invention to provide an improved floating point multiplication operation in a computer.

Still another object of this invention is to provide serial floating point multiplication in an electronic computer.

A still further object of this invention is to provide floating point multiplication requiring no programmed normalization or de-normalization.

A further object of this invention is to provide an automatic normalizing and de-normalizing floating point operation within a computer.

Another object of this invention is to provide a computer for handling floating point numbers in a more compact form.

A final object of this invention is to provide an entirely automatic floating point multiplication operation within a computer.

Still other objects and features of this invention will become apparent from the following drawings of which:

FIG. 5 is an explanation of each of the operation codes;

FIG. 6 illustrates logic for I*n*D*o* phase of the floating multiply operation;

FIG. 7 illustrates logic for the U1 phase of the floating multiply operation;

FIG. 8 illustrates logic for the U*i* phase of the floating multiply operation;

FIG. 9 illustrates logic for the Nz phase of the floating multiply operation;

Figure 1:
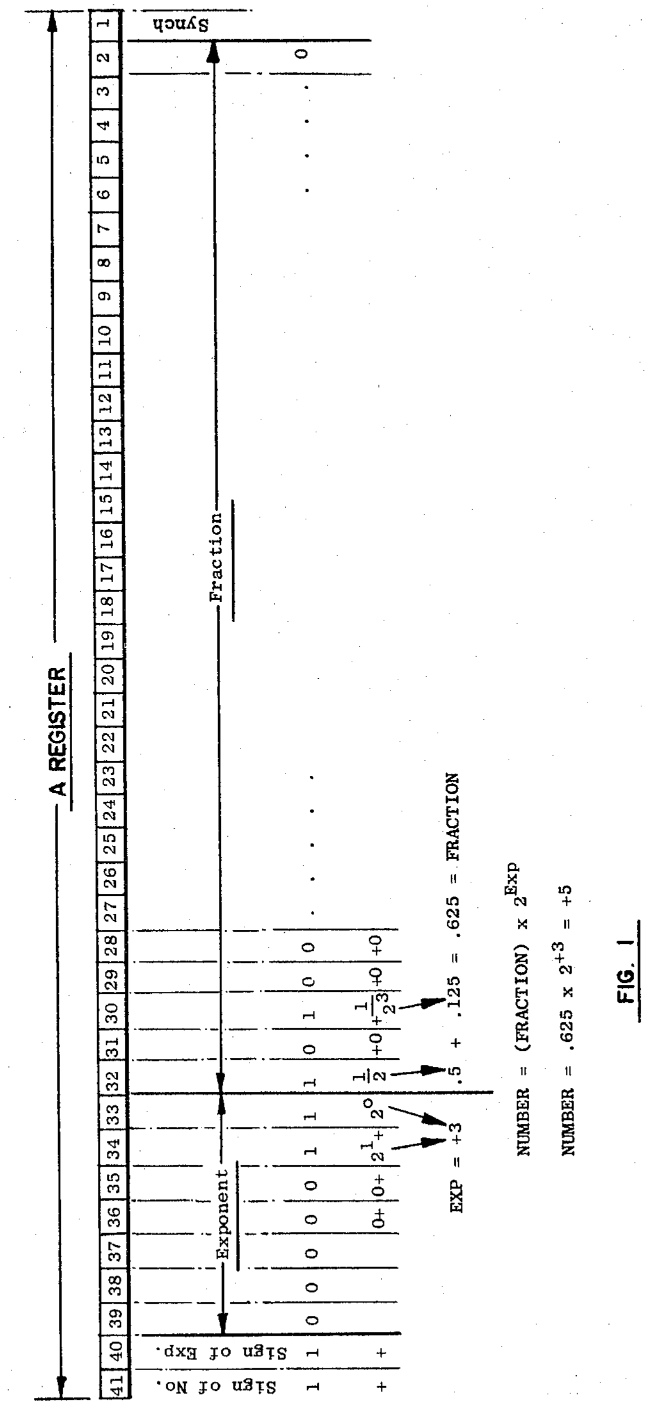
FIG. 1 is an illustration of a positive operand having an exponent portion and a fraction portion contained in an accumulator or "A" register within a computer.

Referring now to FIG. 1, it is seen that floating point information may be handled in a computer in words each consisting of 41 bits, the bits being numbered from right to left in order of increasing significance. The first bit is a synchronizing bit and is not utilized in computer operations. Bits 2 through 32 are utilized to indicate in binary form the fraction portion of the particular floating point number being processed. The bits 33 through 40 are used to indicate the exponents, that is the power to which the number 2 is raised. With such 8 bits, therefore, the number 2 may have any power from zero through 255, however, by introducing a bias of −128, the range is shifted by 128 to a range of −128 through 127 with bit 40 being utilized to indicate whether the exponent is plus or minus. For example, to represent a number having a negative exponent such as is the case of $2^{-128}$, bit 40 is false (or "zero") and bits 33 through 39 are 0000000. For $2^{-1}$, bits 40 through 33 are 01111111. For $2^{0}$, bits 40 through 33 are 10000000. For $2^{+1}$ bits 40 through 33 are 10000001. For $2^{+2}$, bits 40 through 33 are 10000010. For $2^{+126}$, bits 40 through 33 are 11111110. For $2^{+127}$, bits 40 through 33 are 11111111.

Another way to describe the biasing effect is to consider a register having a capability of counting from zero through 255. However, in order to establish a capability of counting below zero, there is included in the computer logic gates to indicate a 01111111 for the exponent (−1, which stands for $2^{-1}$) and there are additional logic gates to cause the computer to count down (−1 through −128) from 01111111 to 00000000. If bit 40 is minus then each bit changed to 0 from 1 represents a greater numerical value (disregarding the sign). Thus −1 represented by 01111111 would be decremented to −128 represented by 00000000. If bit 40 is plus each decremented bit represents a decrease over a range of 127 through zero. Where the zero is relocated at the center of a register's counting range (the computer formerly being capable of counting from zero to 255, i.e., an 8 bit counter) allotting zero to one of the counts leaves a capability of counting up to +127 and down to −128.

In effect by dividing zero through 255 into two parts by appropriate logic gates, the register counts up from zero through 127 and down from −1 through −128. If bit 40 is minus, the register counts over the negative range. If bit 40 is positive, the register counts over the positive range.

Figure 2:
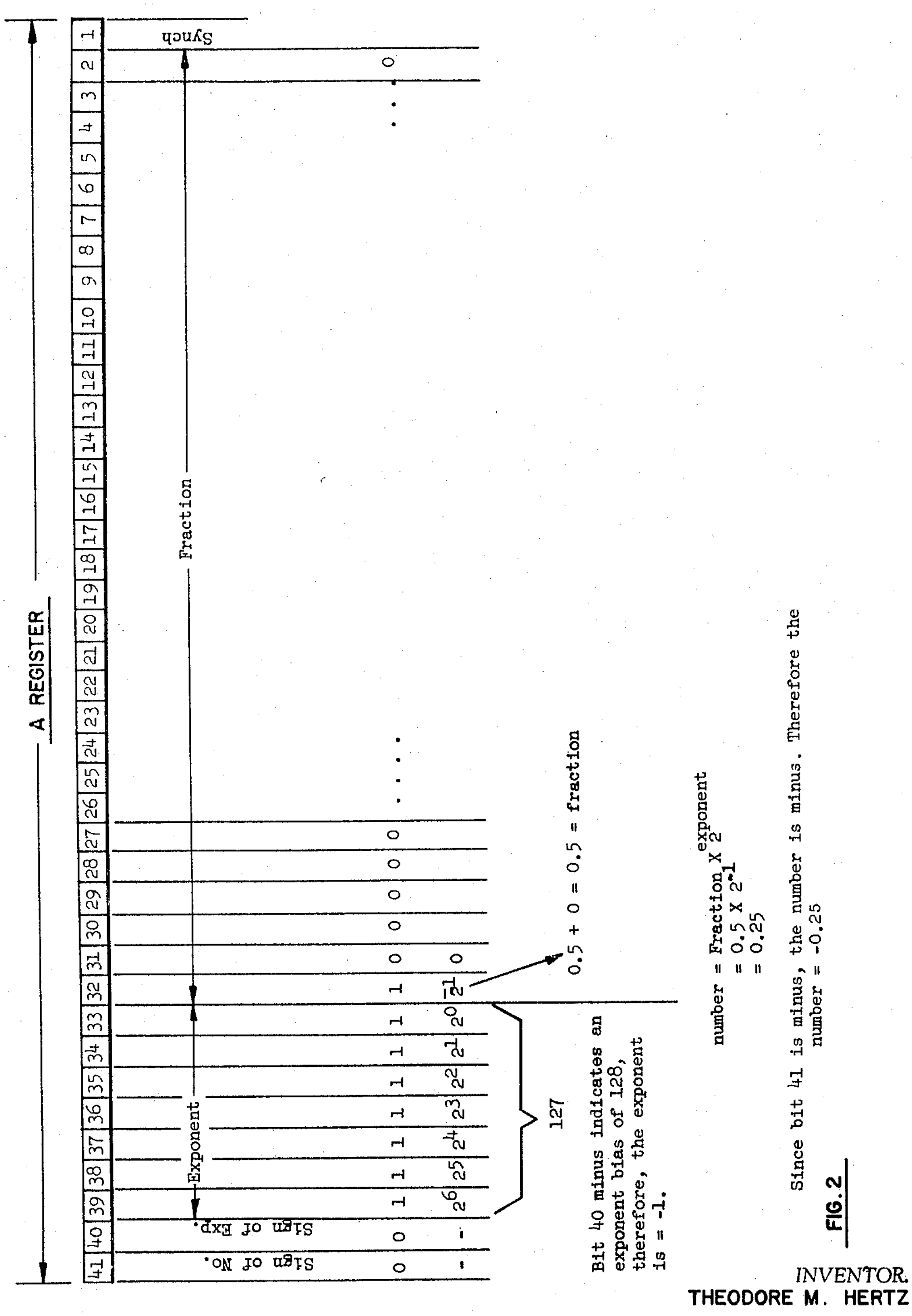
FIG. 2 is an illustration of a negative operand having an exponent portion and a fraction portion contained in an accumulator or "A" register within a computer.

A negative number is illustrated in FIG. 2. The exponent is expressed in 2's complement form which is obtained by subtracting the negative number from all zeros. The A40 bit is reversed during the multiplication operation so that the product will have the correct sign.

In all floating point operations, logic control is utilized to insure that all operations specified by the instructions are performed in the correct mode and in the proper sequence. Basic control elements in the computer are logic gates and flip flops operating in conjunction with control registers and other registers. The states of the flip flops define the logic control functions of mode designations, operation selection, loop and main memory selection, channel selection, and sector selection.

Figure 3:
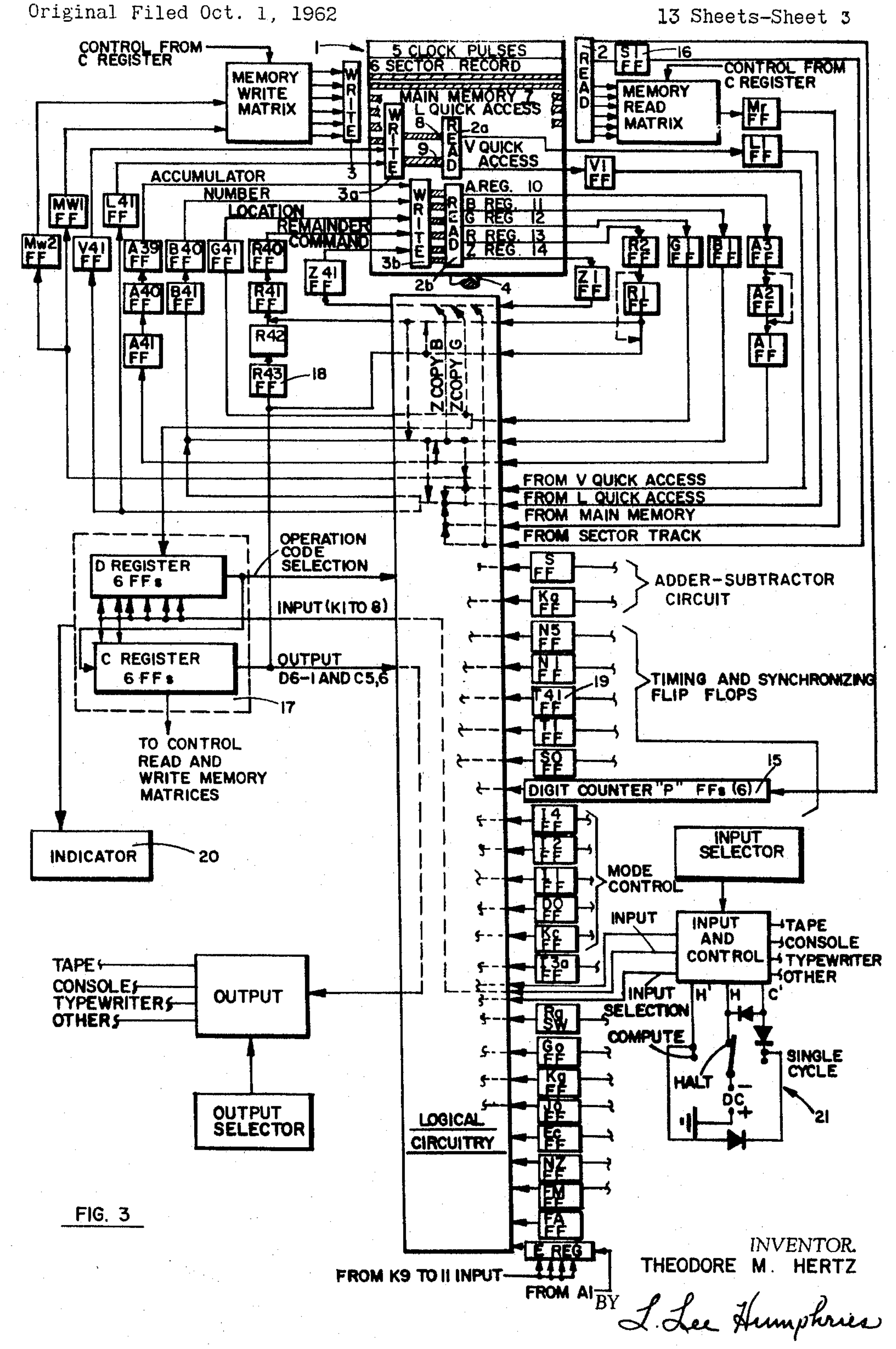
FIG. 3 is an illustration representing an entire electronic digital computer.

Flip flops I1, I2, and I4 shown in FIG. 3 are the primary elements controlling the computer through the various modes and in the transitions from one mode to another. Two other flip flops designated as mode selection flip flop K*c* and memory write-read gating flip flop D*o* are also utilized as control elements. However, both K*c* and D*o* also perform other functions on a time sharing basis as do a number of other logic flip flops.

A D register comprised of flip flops D1 through D6, illustrated in FIG. 3, defines the type of operation to be performed by the computer. The flip flop settings are determined by the bit configuration and the operation code of each command. Outputs of the flip flops then control the operation control gating matrix to define the type of operation specified.

The C register is comprised of flip flops C1 through C6. The C register holds the channel address code which controls the gating of the write and read switching networks in the selection of a designated memory channel. Outputs of these flip flops enable the write or read head of a selected channel after a desired sector has been located during the sector selection phase.

Sector selection is the procedure which determines the sector location of a designated command or operand in the memory. The Z register, the origin sector channel, and several associated flip flops comprise the sector selection elements.

The control registers (Z and G) and their associated logic circuits perform many of the control functions required in the location storage modification and execution of commands and in the handling of data. The "A" register is comprised of a write and read amplifier and 39 bits circulating in the loop register channel. The Z register stores the command pair being executed. The G register, also comprised of a read and write amplifier and 39 bits circulating in the loop register channel, contains storage space for the location counter, index register. The G register is also used as a computation cycle counter.

The arithmetic registers (A, B, and R) and their associated logic circuits perform the basic computer arithmetic functions of addition, subtraction, multiplication, and division. These registers also perform many semi-arithmetic and control functions. In the execution of arithmetic commands the registers utilize two additional flip flops which, during the computations, form an adder-subtractor circuit.

Figure 4:
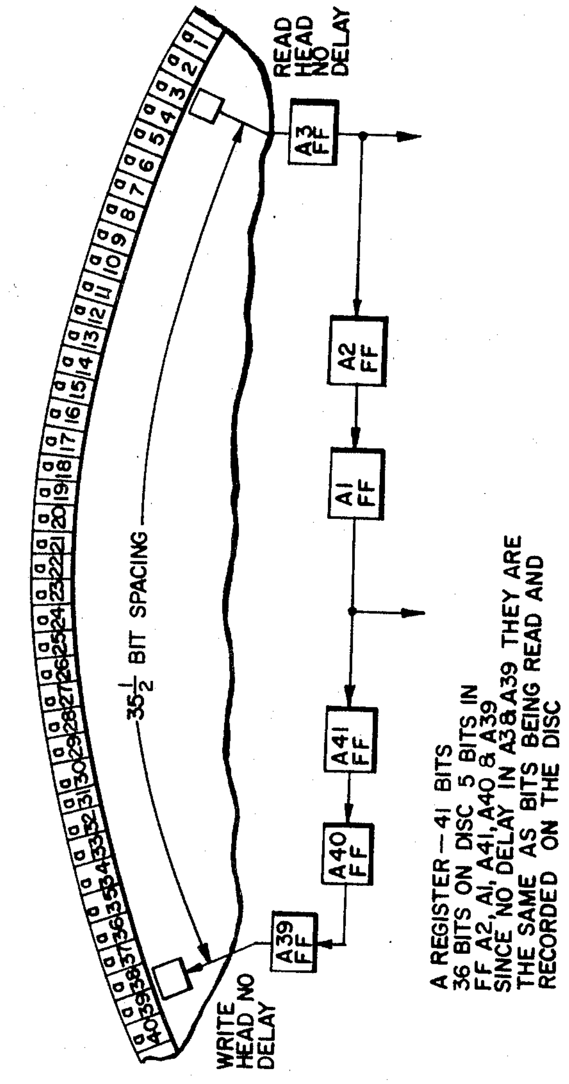
FIG. 4 is an illustration of an accumulator or "A" register.

The A or accumulator register shown in FIG. 4 stores the information in six flip flops and in 35 bit positions in the loop-register channel. Utilized in all arithmetic computations, the A register accumulates all or a portion of the result of each computation.

The B register shown in FIG. 3 which is also referred to as the number register, utilizes three flip flops and 38 bit positions in the loop register channel. This is an intermediate storage register which is not directly addressable by the programmer. In most instances, the computer first stores a command or operand being read from or written into memory in the B register, and then transfers the word to the intended locations as required. The remainder or R register shown also in FIG. 3, stores its contents in four flip flops and 37 bit positions in the loop register channel. (R42 and R43 flip flops are not an integral part of the register.) This register may be utilized as an extension of the A register in the execution of multiplication and division commands.

Principal computer elements involved in the execution of the arithmetic processes are the three arithmetic registers and the adder-subtractor circuit. The adder-subtractor circuit is comprised of a sum-difference flip flop S and a computation carry-borrow flip-flop K*a* which operate in conjunction with the arithmetic registers to carry out the computations. The flip flops S and K*a* are illustrated in FIG. 3. Other computer elements such as the memory read/write circuitry and the control registers also are utilized. However, these other elements perform associated functions which generally enter into virtually all of the computer operations.

The three arithmetic registers and the adder-subtractor circuit are the principal computation elements for both the fixed point and floating point arithmetic processes. However, additional flip flops and primary and secondary gates are necessary to control the floating point processes. For example the computer utilizes the additional flip flop F*a* during floating point addition and subtraction functions and F*m* during floating point multiplication and division functions. Flip flop E*c* is designated as the comparison flip flop for floating point addition and subtraction and division, flip flop N*z* is designated as the normalization flip flop for floating point addition, subtraction and multiplication. Primary gates $\underline{M0}$, $\underline{M1}$, $\underline{M2}$, $\underline{U1}$, and $\underline{Ui}$ are also utilized during the floating operations. $\underline{M0}$ is used during addition and subtraction operation. $\underline{M1}$ is used during multiplication operation. $\underline{M2}$ is used during divide operation. $\underline{U1}$ signifies the second word time of all operations, and $\underline{Ui}$ signifies all succeeding word times.

Further explanation of a computer and its operation may be obtained by reference to Patent No. 3,237,168, issue date February 22, 1966 for "Computer" invented by me. The various operations and modes of a general purpose, scientific computer are set forth in that application as well as a description of conventional logic notation. Logic for fixed point operations to which reference is made herein is included in that application. For example, fixed point division and multiplication operational logic is described.

FIG. 5 is a further explanation of each of the codes. It is noted that code 23 (FMP, floating multiply) is primarily involved in this description. However, in carrying out this code, other codes are "forced" (entered). For example, fixed point multiplication mode 63 may be temporarily entered to make use of its right shifting capability. As soon as the shifting is accomplished, that mode is ended and others are forced until the floating point operation is completed. Also, the addition mode 73 may be temporarily entered into. Additional modes described herein are also entered as necessary.

Figure 11:
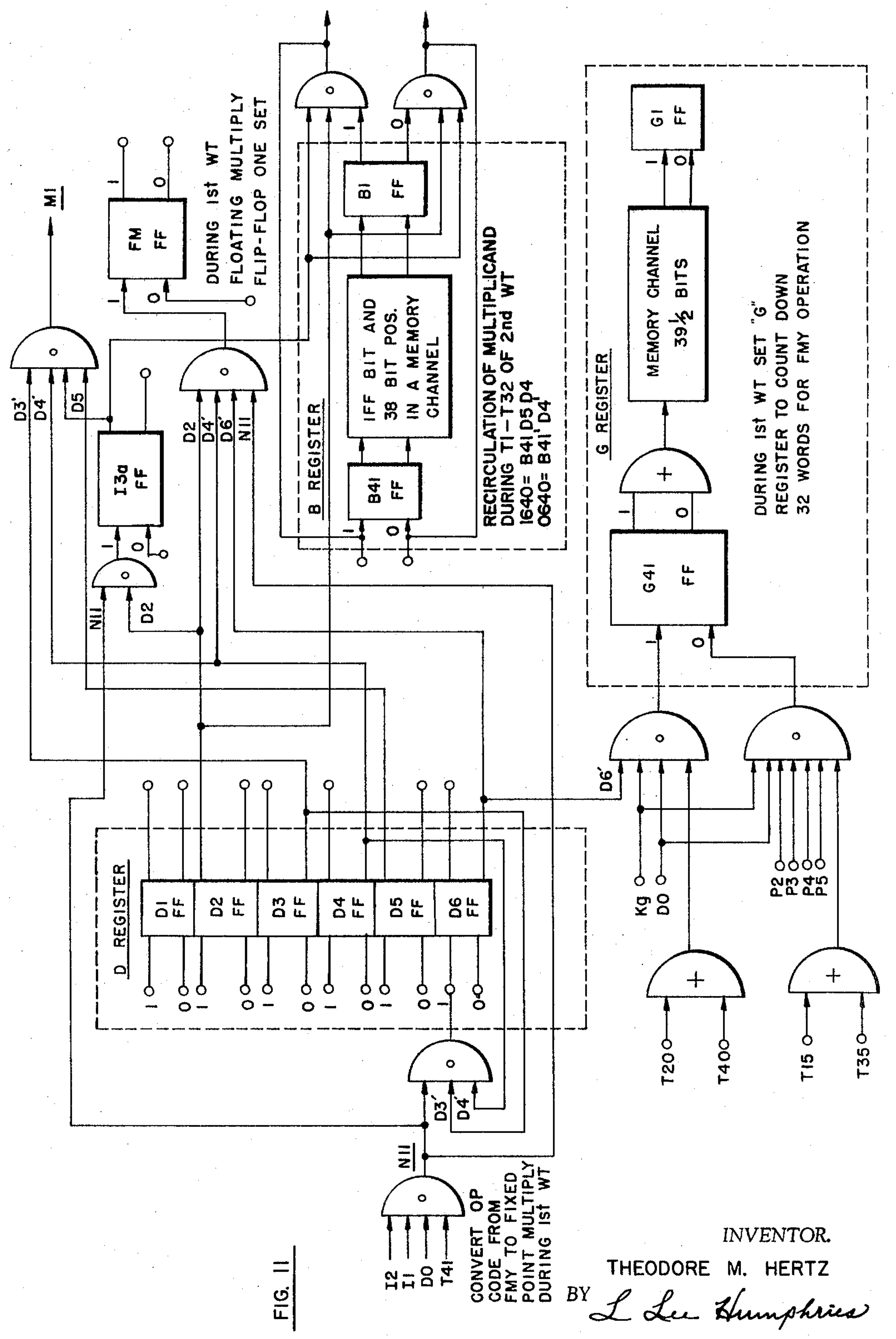
FIG. 11 illustrates a portion of the logic mechanization for floating multiplication operations.
Figure 12:
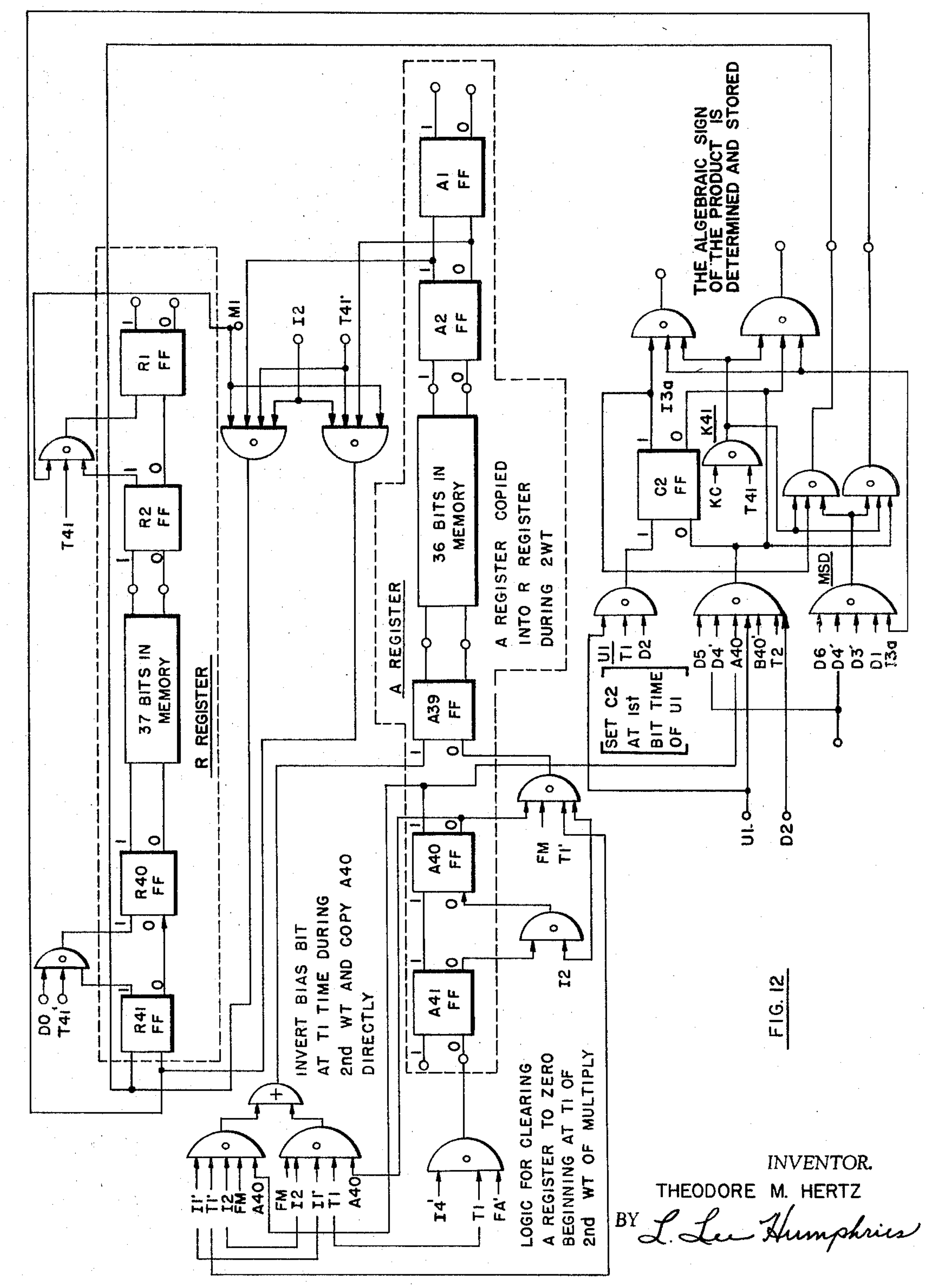
FIG. 12 illustrates a portion of the logic mechanization for floating multiplication operations.

FIGS. 11 and 12 illustrate examples of logic mechanization inside a computer for the floating multiply operation. Symbols used for the figures to designate "and" gates, "or" gates and flip flops are well known in the art.

Figure 13:
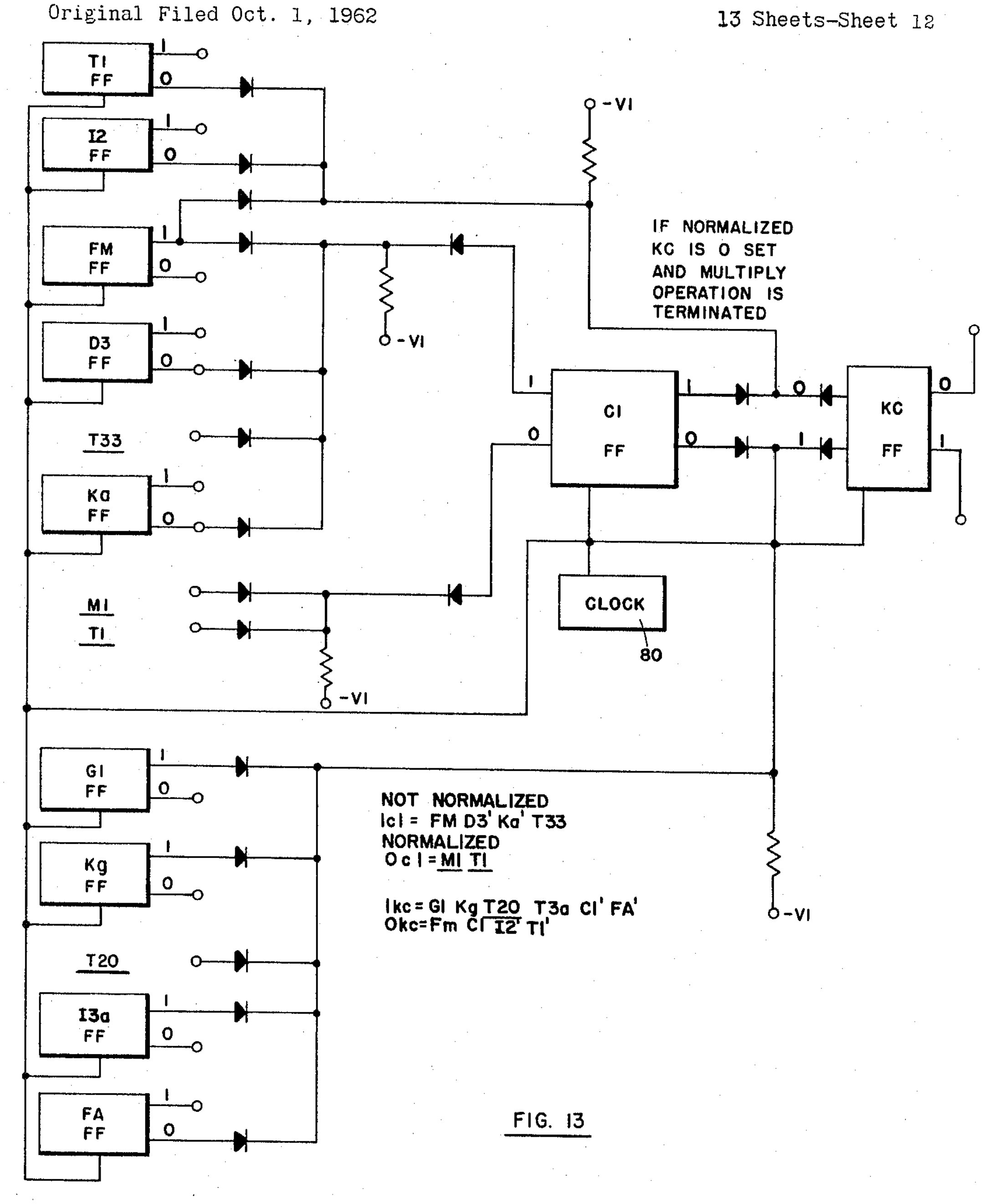
FIG. 13 illustrates an actual electronic mechanization of the C1 flip flop checking the most significant bit of the product for normalization.
Figure 14:
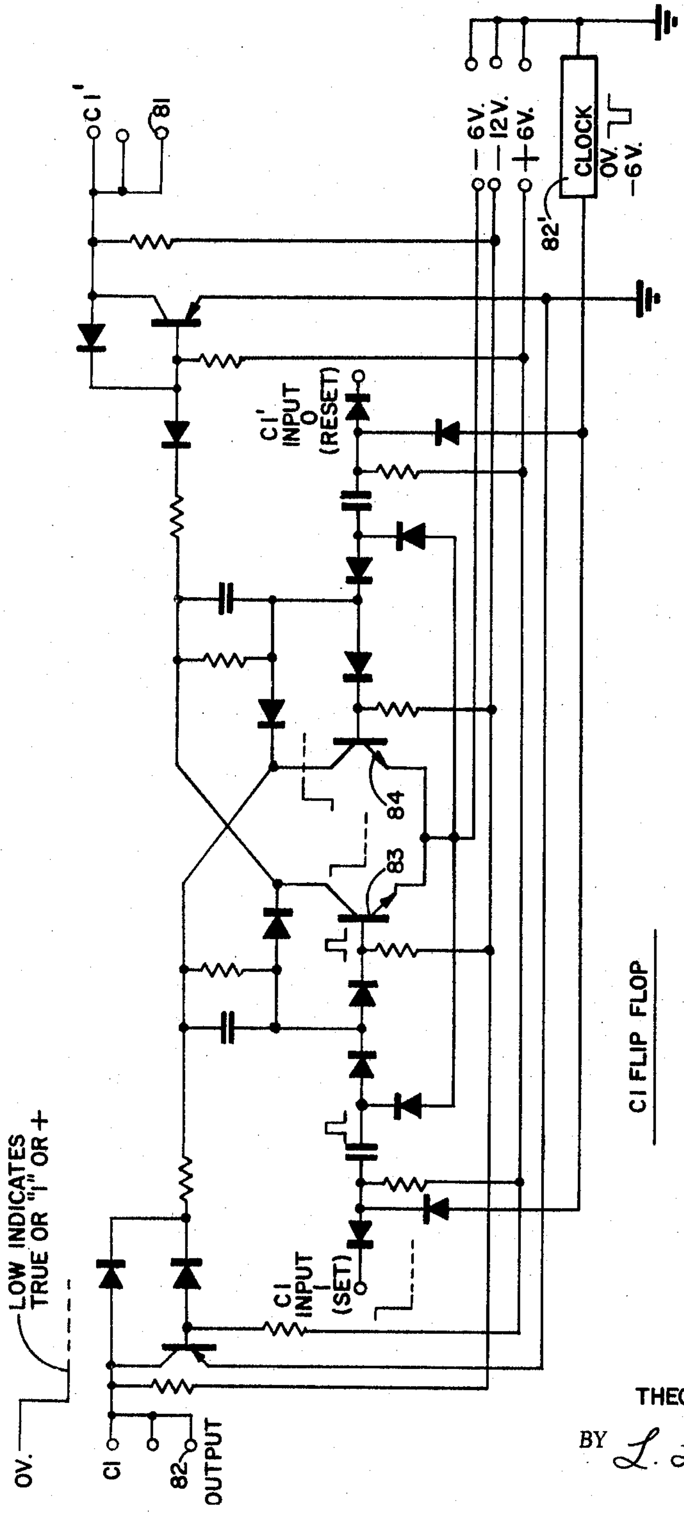
FIG. 14 is an illustration of a clock gated flip flop suitable for use in the device of the invention.

FIG. 13 illustrates an example of logic mechanization using conventional diodes, resistors, and voltage supplies. The C1 flip flop, which may be constructed as set forth in FIG. 14, is gated by a clock 80. The other flip flops shown are also gated by clock 80. Flip flops F*m*, D3, K*a* and gate T33 act to set flip flop C1 to its one state. Primary gates M1 and T1 act to set flip flop C1 to its zero state. Flip flop K*c* is one set and zero set by flip flops F*m*, I2, and I1, G1, K*g*, I3*a*, F*a* and primary gate T20 respectively. Discussion of "and" gates and "or" gates may be found in "Digital Computer Components and Circuits" by R. K. Richards, 1959.

FIG. 14 illustrates an example of a flip flop circuit which is represented by the box symbols in previous figures. The flip flop C1 illustrated in FIG. 14 shows two transistors 83 and 84, one of which conducts when an input is received at the "1" input terminal. The other conducts when an input is received at the "0" input terminal provided a clock pulse from clock 80 is also received. If one transistor conducts, the other is shut off. Therefore, a −12 v. output is provided at terminal 82 or 81 depending on whether the flip flop is in its "one" state or "zero" state respectively. Flip flop circuits are discussed in "Transistor Circuit Engineering" by R. F. Shea. Although only certain select portions of the logic have been mechanized, the remaining logic could be mechanized in the same manner as is well known to those skilled in the art.

FLOATING MULTIPLY

The following description analyzes and describes more specifically the floating point multiplication, FMP.

*Preliminary mode, InDo phase*

FIG. 6 sets forth the I*n*D*o* preliminary mode which commences when the operation code in the D register is 23. Operation code 23 signifies floating point multiply. It is assumed that the multiplier operand is in the A register originally and the multiplicand operand is copied into the B register during this preliminary I*n*D*o* phase. During this phase flip flop F*m* is one set at T41 time of I*n*D*o* phase. The logic for this setting is set forth in FIG. 6. The logic mechanization is illustrated in FIG. 11. In order to count word times involved in the floating point operation, a count of 32 is set up initially in the G register by writing a "1" into the G20 or G40 bit positions and a '0" into the G15 or G35 bit positions. The D6 flip flop is 1 set at T41 time to convert the operation code from floating point multiply to fixed point multiply (63) and flip flop I3*a* is 1 set to turn on the $\underline{M1}$ primary gate in preparation for multiply.

*U1 phase*

Since the $\underline{M1}$ primary gate is true, the multiplier bits A2 through A32 in the A register are copied into the R1 through R31 bit positions of the R register. By having R41 copy A2 while the R register is likewise shifted right, the A register is cleared by setting A41 to zero at T1 and shifting right. Logic for these and other commands of this phase are shown in FIG. 7.

During the first word time the fractional contents of the B register are recirculated in order to preserve the multiplicand. The multiplicand recirculation occurs during T1 through T32.

The most significant bit of the exponent, the A40 bit, which is the exponent bias, must be inverted at T1 time from A40 to A39 and is written into the loop register channel of the A register directly at T1′ time by the A39 flip flop.

The addition of exponents occurs next using standard fixed point adder logic. Flip flop R1 is one set at T32 time and is zero set at T40 time. When R1 is one set the exponent of the multiplicand, contained in the B register bit positions B33 through B40, is gated into the adder and is added to the exponent of the multiplier contained in the R register, in bit positions R33 through R40. Flip flop D4 previously had been one set at T33 time to convert the operation code from fixed point multiply to fixed point add. The sum of the exponents is written into the B register from S flip flop to B40.

At the end of the U1 phase the B register contains the mantissa of the multiplicand and the sum of the exponents. Flip flop J*o* is utilized to detect possible overflow and underflow of the exponents during exponent addition.

Flip flop D4 is zero set at T41 time to convert back to the operation code 63 for fixed point multiply thereby causing primary gate $\underline{M1}$ to be true. The algebraic sign of the product is determined and stored. If the sign bits of the multiplier and multiplicand are not equal then C2 flip flop is zero set. This indicates a negative product. If the sign bits are different, flip flop D2 remains "1" set.

*Ui phase*

This phase is the same as fixed point multiplication phase except that the size of the fraction is 31 bits. Logic for this phase is illustrated in FIG. 8. The multiplication process consists of successive multiplications of the multiplicand by each digit of the multiplier, a right shifting of the result of each step by one digit, and the addition of the result of each step to the result of the previous step to form a partial product. The addition of the results of the final step to the previous partial product yields the final product. The adder performs the necessary addition in each step of the multiplication computation. Fixed point addition is employed in performing the successive additions comprising the multiplication process. Fixed point addition, subtraction, multiplication, and division as well as other general computer operations are described in detail in Patent No. 3,237,168, issue date February 22, 1966 for "Computer" invented by me. The partial product is transferred into the A register through flip flop A39 and is shifted right one digit during successive steps of the multiplication process. The shift is accomplished by transferring the partial product into A39 rather than A40 thus decreasing the A register length by one bit position. Logic used for the sum and carry flip flops in the adder is identical to that used for fixed point addition and subtraction.

At T32 time the D4 flip flop is one set to stop processing of the A register. By one setting the D4 flip flop operation code 73, fixed point addition, is entered into the computer which causes a termination of the multiplication after 32 bit times. One setting of the D4 flip flop also causes the cascaded "and" gate $\underline{Mo}$ to be true.

To copy the exponents from the B register to the A register beginning at T34 time the least significant bit present in B41 at T34 is copied into the A40 flip flop.

*Termination (part of U1 phase)*

The C1 flip flop is used to check the most significant bit of the product for possible normalizing. If the product is already normalized then it is the last word time count of multiply, the termination flip flop K*c* is one set which terminates the operation and the entire product is forced to zero.

*Normalizing phase (Nz)*

In the case of a product that requires normalizing, the N*z* flip flop is one set at T20 or T40 to set for normalizing.

Logic mechanization is shown in FIG. 9. Operation code 42 for designating a long left shift operation, is set up in the D flip flops at T41 time. The most significant bit of the R register is copied into the least significant bit of the A register.

Operation code 42 is then converted into operation code 72, fixed point subtract, in order to subtract one from the exponent. The Nz phase is terminated by one setting the Kc flip flop.

*Zero termination phase (U1 phase)*

If any one of the factors is zero, the product is zero and termination occurs immediately. A zero test is performed at T32 time and if the most significant bit is zero, K*c* is one set which terminates the operation.

SUMMARY

The multiplier operand is originally entered into the A register as an exponent and a fraction. During the first word time of the floating multiply operation the multiplicand operand, also having an exponent and a fraction portion, is copied into the B register and a count of 32 is set up in the G register so that the operation will be terminated after 32 additional word times. Operation code 63 for fixed point multiply is entered into the D register so that the A register shifts multiplier bits into the R register during the second word time of the floating multiply operation. During the second word time of the operation, in addition to the shifting of the multiplier bits from the A to the R register, the A register is cleared and the B register re-circulated. The sign of the product is determined and stored during the second word time. The sign is reinserted into the A register after the product of the multiplication and after the sum of the exponents have been determined and re-inserted into the A register. If the fraction portion of either the multiplier or entered multiplicand is zero, the operation is terminated. The exponents are added and copied into the B register. If an exponent overflow or underflow occurs then flip flop J*o* is one set. During the next 31 word times of the floating multiply operation, the actual multiplication of the mantissas or fraction portions is performed. During this time one multiplier bit is multiplied times the multiplicand and the partial product is stored in the A register. The B register is recirculated during this time to preserve the exponent and the multiplicand. Also during this 31 word times the exponent is copied from the B register into the A register so that at the end of the 31 word times for this portion of the floating multiply operation the exponent and the product obtained by multiplying the contents of the B and R registers is contained in the A register. Multiplication of the fraction operand is carried out by successive serial additions; for example, each bit of the multiplier operand in the R register is checked, if the bit, called a partial multiplier bit, is a one bit then the multiplicand operand is copied into the A register as a partial product. After each successive serial addition the partial multiplier is lost and the multiplier operand is reduced by one bit. By way of illustration, assume that a multiplier operand of 1011 is contained in the R register and a multiplicand operand of 1010 is contained in the B register, the multiplication operation would be executed as indicated on the following chart:

| | Partial Multiplier (R register) | | Multiplicand (B register) | | Partial Product (A register) | |
|---|---|---|---|---|---|---|
| 1 | 1 | × | 1010 | = | 1010 | First partial product. (Right shifted 1 bit.) |
| 2 | 0 | × | 1010 | = | 0000 | |
| | | | | | 01010 | Second partial product. (Right shifted 1 bit.) |
| 3 | 1 | × | 1010 | = | 1010 | |
| | | | | | 110010 | Third partial product. (Right shifted 1 bit.) |
| 4 | 1 | × | 1010 | = | 1010 | |
| | | | | | 10000010 | Final product. |

Figure 10:
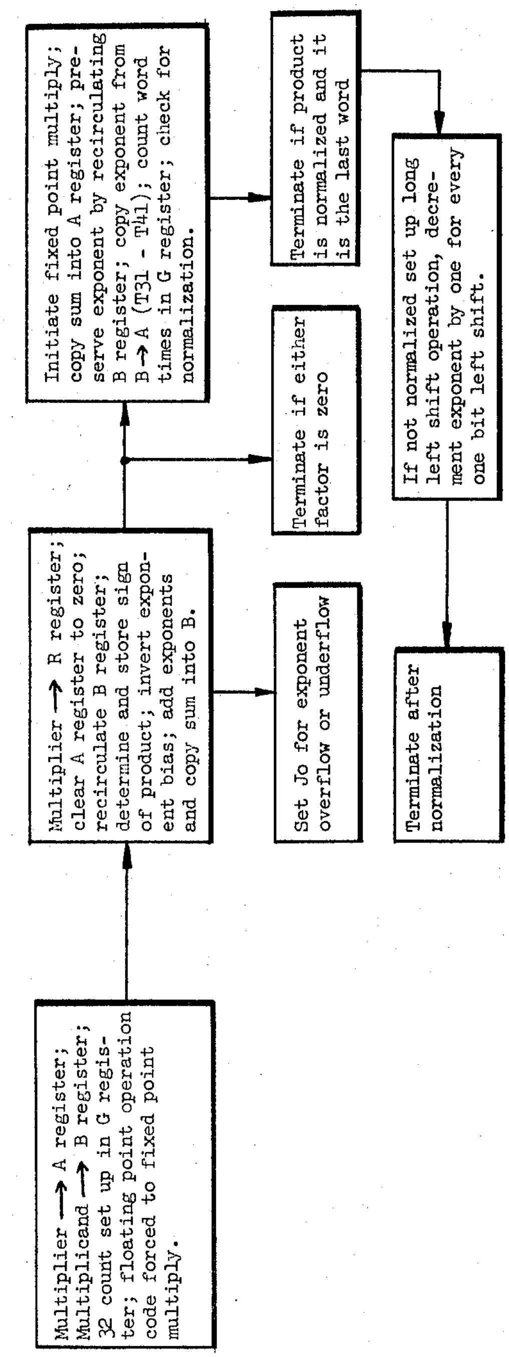
FIG. 10 illustrates a block diagram of each step of the floating multiply operation.

If the multiplier bit is zero as in step 2 above, then zeros are added to the partial product obtained from the first multiplication which is then shifted right to form the second partial product. The partial product of each step of the multiplication operation is stored in the A register. In step 3 the partial multiplier bit is one so the multiplicand operand is added to the partial product previously obtained. After all the steps of the operation are completed the final product shown by step 5 above is contained in the A register. A check is made to determine if the product is normalized and if the product is normalized during the last word time, the operation is terminated. If it is not normalized then an additional one word time must be utilized so that the product can be shifted left. And, of course, for each left shift, "one" must be subtracted from the exponent. Then an additional check is made to determine if the product is normalized, if so, the phase is terminated. FIG. 10 illustrates a block diagram of each phase of the floating multiply operation.

*Logical equations*

A computer utilizing the concept of the invention was set forth and described in the patent application previously referred to. Such computer is also set forth in the logical equations included below. The computer incorporates 48 flip flops (bistable multivibrators or some other suitable bistable device) whose states are determined in accordance with the logical propositions set forth in the equations. For brevity and clarity, in some instances, symbols are used to indicate the settings of two or more flip flops. Such symbols and their meanings are also set forth. In addition, there are constructed several special gates operated according to the existence of two or more conditions. Various flip flops such as G1, Z1, B1, and A3 do not appear in the logical equations inasmuch as they are driven directly by the memory read heads or amplifiers. The logical equations are as follows:

*Logical equations for flip flops*

$n1$:

$1n1=P6'P5'P3'P2P1KcDo'I1+Go'P6P5'P3'P2P1KcDo'+HoSoT40I2+GoT2Kc'+Go'T22Kc'+I1'C'T40$ $0n1=P5P4'P1'Kc'+KaP4P2Kc'+WsU2P1+KcP5P4P2Do'+HoI2T41$ $so$:

$1so=Kc'Do'Z1S1'N1T41'+Kc'Do'Z1'S1N1T41'+A1InKcT41'T1'+InD5'D4'T1Kc'+Z1S1WsT8+Z1'S1'WsT8+RgDoT1+Z1S1WsT28+Z1'S1'WsT28+HoD6D5T2$ $0so=T41$ $g41$ Write:

$1g41=G1Kg'T41'+G1'KgI1'Do'+Z1HoN5Go'P6+C1'InKgDo'+N1T41P6+G1IqP6'+R43HoN5GoP6+DoKgT14P1'D6+G1H'T41I1+B1'HoN5'R42D5+DoKgT20D6'$ $0g41=G1'Kg'T41'+G1KgI1'Do'+Z1'HoN5Go'P6+DoKgP5P4P3'P2+B1HoN5'R42D5+R43'HoN5GoP6+C1InKgDo'+G1'Iq+IqI2P6+DoKgT20D6+G1'N1'T41P6+IqHT41P6+I1'N1'T41$ $go$:

$1go=G1T22InKc+I1'K41$ $0go=IcDo'+IcN1'T41$ $kg$:

$1kg=NR3I2T21Fa'+IqI2+P1I2'GoN5T14P6'+P1I2'Go'N5T14P6+T2MsLD5'C6+GoI4'T14P6'P1+Go'I4'T14P6P1+GoP6'NR13+NR3T2D6'D42D1'N5'+Go'P6NR13+NR3T1D6'D5M7+FaD2'T21$ $0kg=G1'KgI1'Do'+T20$ $do$:

$1do=I3G1'R42D6'D42D1'+So'KoI4'I1Do'+So'UiD4'D2'Do'T41+M2C1'Ko+N1K41+U1M7T1$ $0do=HoN5'T14D1I2P1+K41G1'N1'+I1DoT41$ $mr$:

$1mr=MaC6'C5'C4'+MbC6'C4+McC6'C5C4'+MdC6'C5C4+MeC6C5'C4'+MfC6C5'C4+MgC6C5C4'+MhC6C5C4$ $0mr=Ma'C6'C5'C4'+Mb'C6'C5'C4+Mc'C6'C5C4'+Md'C6'C5C4+Me'C6C5'C4'+Mf'C6C5'C4+Mg'C6C5C4'+Mh'C6C5C4$ $ec$:

$1ec=A41'B41I1R42'+A1B1'Ka'Te+A1'B1Ka'Te+A1B1KaTe+A1'B1'KaTe+FmP6P5P3'$ $0ec=A41B41'I1R42'+T2Fm'$ $p1$:

$1p1=P5'P1'T41'+T21$ $0p1=P5'P1+T41$ $p2$:

$1p2=P1T41'$ $0p2=P1'+T41$ $p3$:

$1p3=P2T41'$ $0p3=P2'+T41$ $p4$:

$1p4=P3T41'$ $0p4=P3'+T41$ $p5$:

$1p5=P4T41'$ $0p5=P4'+T41$ $p6$:

$1p6=T21$ $0p6=T41$ $t41$:

$1t41=T40+T40+S1IqI2$ $0t41=T41$ $t1$:

$1t1=T41P6$ $0t1=T1$ $cj$:

$1cj=Cj'$ $0cj=Cj$ $z41$ Write:

$1z41=B1G1R43Ix+G1IcKcDo'+B1G1'R43Ix+B1'G1R43'Ix+B1'G1'R43Ix+Z1Go+B1InKcGo'R42'+Z1Kc'+Z1I1'$ $0z41=B1'G1'R43'Ix+Z1'Go+B1'InKcGo'R42'+Z1'Kc'+Z1'I1'+B1'G1R43Ix+G1'IcKcDo'+B1G1'R43Ix+B1G1R43'Ix$ $n5$:

$1n5=T1InDo'+IcKcT22+KcDoT21+U1M7T1D6+G1'T22InDo'+14I1'S'KaT1+Td$ $0n5=T41+DoT14+T20I4'$ $nz$:

$1nz=FaI2'D4T32+FmG1KgT2OD3'$ $0nz=I1$ $fm$:

$1fm=N11D6'D4'D2$ $0fm=I1T1+NzT41$ $d6$:

$1d6=Z1InKc'Do'N5+SoInT4D5'D42D1+K8Pm+G1IcN5+A1N6KaC4'+B1Go'InN5Kc+Z1GoN5I3a'I2I4'+E1N6KaC4+T31D6'+N11D4'D3'+N11D4'D2Ec+FmC6A2'T1'$ $0d6=N5Ka'I4+A1'N6C4'+B1'Go'InN5Kc+G1'IcN5+Z1'GoN5I4'I3a'I2+Z1'InKc'Do'N5+E1'N6C4+T31D6+FmI2D1'T32C6'$ $d5$:

$1d5=D6N5+K7Pm+NzT33$ $0d5=D6'N5+NzT41$ $d4$:

$1d4=D5N5+K6Pm+I3D6'D3'D2'R1T40+NzT33+FaT33+FmT33D3'+FmT33I2+FmDoT32$ $0d4=D5'N5+FaEcT41+NzT41+FmT41$ $d3$:

$1d3=D4N5+I3aD6'D5'D4T40+I3aD5'D1'T40+K5Pm+NzT41+FmT41D1'$ $0d3=D4'N5+A3T41InD6'D5'D42+A1InD6D5'D42T41+NzT33+FmT33I2+FaNz'T41+InDoD6'D4'D2A1'T32$ $d2$:

$1d2=D3N5+K4Pm+FaT41$ $0d2=D3'N5+D1'InM5T41+A1'InM5T41+I3aNR8A1'+I3NR8R40'T1$ $d1$:

$1d1=JoInM5D2T41+M2I2T41+So'InT41M5D2'+D2N5+A1'KaM2T41+A41'B41D1'MoI2T1+A41B41'D1'MoI2T1+K3Pm+Ka'T41NR50Fa'+M2Do+FmI2T41+A1'KaT33FmI2'Nz'+MooD2'+FaNz'I2'T32$ $0d1=D2'N5+A1KaM2I2'T41+A41B41'MoD1I2T1+A41'B41MoD1I2T1+NzT41+A1KaT33FmD3Do'$ $fa$:

$1fa=MooD2'$ $0fa=I1$ $c6$:

$1c6=D1N5+K2Pm+I3aD5T32+T31D6$ $0c6=D1'N5+I3aD5P4'P2'$ c5:
1c5=C6N5+K1Pm+FaC1ST1'+I3aB41T1D5
0c5=C6'N5+FaT2+I3aB41'T1D5
c4:
1c4=C5N7+I41Ia+O41Io+I3aD5'T4O
0c4=C5'N7+I40Ia+O40Io+NR3T1D2+Td
c3:
1c3=C4N7+I31Ia+O31Io+FaD1'P6P5P4'P3'
0c3=C4'N7+O30Io+I30Ia+Td+I3aP5'
c2:
1c2=C3N7+U1T1D2+I21Ia+O21Io+FaI2T1
0c2=C3'N7+D6D52D1U1T2A40'+D6D52D1'U1T2R40'+Td+S'MoI2'T1Fa'+I3aD6'D5'D4D1'C6+U1D4'D2A1'B1T41D5+U1D5D4'D2A40B40'T2+I20Ia+D6'D52D4'U1T2A40'+O20Io+A40T2I3aD6'D5'D4D1C6'+A40'T2I3aD6'D5'D4D1C6+MooB40'T2D5+FaI2T2C5'+FmI2T2A40'C5
c1:
1c1=C2N7+I2M2+FmT33Ka'D3'+FaT2
0c1=C2'N7+G1KgI3aT20+M1T1+G1KgT20I4+Td+FaT1+NzT41
r43:
1r43=C1N5Do+R2I3aT41'+I4'I1T1+B1G1Ix
0r43=C1'N5Do+R2'I3a+Z1'Go'T22InDo+Td+Z1'GoT2InDo+B1'G1'Ix+I3aT41
r42:
1r42=R43MsLT41'T1'D6+M2D6D1'I2'T1+A41M2I2T1+R2MoT41'+D2'D1U1R43T1+D5D2'U1R43'T21D4'+I3D6'D1'P6'P3'P2P1'+IcDoB41'T22+MooEc'T1D2'+InDoD6'D2T33
0r42=R43'MsLT1'D6+M2D1I2'T1+I3a'KcT14+I3aD52T1+R2'Mo+D5I3a'T14I1'+K41+I4Tn+N11D2
r41:
1r41=R42MsLD6Do'+R42Mo+C2MsdK41+R2MsdI2'T41'+R1I3a'+A1I3aI2D6D4D3+R1D6'+A2M1I2+R1I2dC4'+R1C4D1'
0r41=R42'MsLD6Do'+R42'Mo+C2'MsdK41+R2'MsdI2'T41'+R1'I3a'+A1'I3aI2D6D4D3+R1'D6'+A2'M1I2T41'+R1'I2dC4'+R1'C4D1'
r40 Write:
1r40=SM2Do+A2MsdT41+R41I3a'+R41D4+R41I2d+R41D6'+R41D3Do'+R41Do'T41'
0r40=S'M2Do+A2'MsdT41I2'+R41'I3a'+R41'D4+R41'I2d+R41'D6'+R41'D3Do'+R41'Do'T41'
r1:
1r1=M2Do'T1+M2D1T1+MoT1+R2M1T41+R2I3a'+R2D5'Nz'+R2D6'Moo+FmT41R2D3'Nz'+FaKcT1+FmI2T32
0r1=I3aD5T40D6+R2'I3a'+R2'D5'+R2'Moo+FaI2T32+FmI2T1D3'+FmI2'T32
e4:
1e4=A1N5Ka+K12Pm
0e4=A1'N5+N5Ka'
e3:
1e3=E4N5+K11Pm
0e3=E4'N5
e2:
1e2=E3N5+K10Pm
0e2=E3'N5
e1:
1e1=E2N5+K9Pm
0e1=E2'N5
s:
1s=S11Ka+A1B1'Ka'I3a+R10Ka'I3a+B1Ro1Ka'I3a+SooKaI3a+I3aC4T41+RooKaI3a+C6N5I1T13+D6I3N10D3'D1T41+I4TT41R42'+I3M7NR51
0s=SooKa'I3a+RooKa'I3a+B1Ro1KaI3a+A1B1'KaI3a+R10KaI3a+S11Ka'T41'C6'N5I1T13+I4TnT41+I3Ka'T40N10+R40'I3aC4T1+I3aD6'T1+FaNzT1
a41:
1a41=MsLT1'Do'S+C2I3aK41+R1U1D6D52D3D1'+A1Ho+R42M2DoT41'+A1I1T1'+A1I3D1+A1U1D53+A1I4N5'+A1B1I3+A1D5'D2'I4'T1'+C5N6+B1MooD2+A1U1D6D5'D1+A1'I3aD6'D52D3D1T41'+A1I3aD2'R42'+B1I3aD2'R42
0a41=MsLDo'S'+I4'T1Fa'+A1'I4N5'+C2'I3aK41+A1'I1+R1'U1D6D52D3D1'+R42'M2DoT41'+A1'U1D53+A1'Ho+Fa'I4'A1'D2'+B1'I3D5D1'+C5'N6+B1'MooD2+A1'U1D6D5'D1+A1I3aD6'D52D3D1T41'+FaI2T1+A1'I3aD2'R42'+B1'I3aD2'R42
a40:
1a40=SI2'NR50+KaMsrFa'+A41I3a'+A41I2+A41D3+FaNz'D4'KcT1'+B41FmD4D1Do'I2'
0a40=S'I2'NR50+Ka'MsrFa'+A41'I3a'+A41'I2+A41'D3+FaNz'D4'Kc'+B41'FmD4D1Do'
a39 Write:
1a39=SMsrT1'+A40I3a'+A40I2Fm'+A40T1I2'+40D3I2'+A40D4+A40'FmI2I1'T1+A40FmI2T1'
0a39=S'MsrT1'+A40'I3a'+A40'I2Fm'+40'T1I2'+A40'D3I2'+A40'D4+A40FmI2I1'T1+A40'FmI2T1'
a2:
1a2=A3
0a2=A3'
a1:
1a1=A3M2Do+R41M2I2'Do'T1Fm'+A2I3a'+A2D3'I2+A2D5'+A2Do'T1'I2'+A2I2D6+A2'FmD6'Ec+A3FmD6'Ec'
0a1=A3'M2Do+A2'I2D6+A2'I3a'+A2'D3'I2+A2'DoT1'I2+A2'D5'+A2FmD6'Ec+A3'FmD6'Ec'
L41 Write:
1L41=MrM6D3'D1'+B1M6LtmS'+L1Do'+L1I2+L1I1+L1S+L1D3Ka'+L1D2
0L41=Mr'M6D3'D1+B1'M6LtmS'+L1'Do+L1'I2+L1'I1+L1'S+L1'D3Ka'+L1'D2
v41 Write:
1v41=MrM6D3'D1+B1M6LtmS+V1Do'+V1I2+V1I1+V1S'+V1D2
0v41=Mr'M6D3'D1+B1'M6LtmS+V1'Do'+V1'I2+V1'I1+V1'S'+V1'D2
b41:
1b41=MrDoKa'So'+S1RgDo+L1D10S'+V1D10S+A1R42D6D2'I1+G1'NR1D5+R1NR1D5'+B1I3aD2+B1I4'Do'R42'
0b41=Mr'DoKa'So'+S1'RgDo+L1'D10S'+V1'D10S+A1'R42D6D2'I1'+G1NR1D5+R1'NR1D5'+B1'I3aD2+B1'I4Do'R42'
b40 Write:
1b40=SMoI2+B41I3a'+B41D5D4'+B41MooD1+B41'MooD1'+B41MoI2'+B41FaD3
0b40=S'MoI2+B41'I3a'+B41'D4'+B41'MooD1+B41MooD1'+U1D52+B41'MoI2+B41'FaD3
ka:
1ka=S11D1T41'D2+B1Ro1D1'I3aT41'D5C3+I1KcT1+I1KcGo'P5'P3'P2+I4ST41+13D4T41+NzT32D5'+FaD4'T32Kc'
0ka=SooD1I3aKa+RooD1I3aKa+A1B1'D1'I3a+R10D1'I3a+13aT41+N11D2+InKcN10D1'T41+14S'T41+IaS'P6T13+Z41'I1N1Kc+Moo+FaD4D1'T32

$kc$:

$1kc=IcDoKo+UiD3D1DoT40+NR3D4T1Fa'$
$+S1'UiDoT40+IqG1'H'T41$
$+U1D52D4'D1'C6A1T40+G1KgI3aT20C1'Fa'$
$+I4I1'G1KgT20C1'+MsLD5'C6ST40$
$+FaI2T41EcD2+FaNzD5T33S+D3NzT32S$
$+FaI2P6T14C5'D1'+FmI2T32B1'$
$+FmT32I2D3'A1+FaD2'A1'B1'T32$ $0kc=U1Fa'NR50+I4'I1K41+Td+MooD2'T2$
$+FmC1I2'T1'$ $jo$:

$1jo=I2KaD1T41NR50+M2I2Ka'T41$
$+A1'B1I3D5D4D3+I3aD2NR8T41$
$+MsLD5'A1T40C5+Jo'A1'T41I3D5D4D3R43'$
$+A1B1'I3D5D4D3R43$
$+Kc'FmI2D1'T40A1'B1'Ka'+NzKaT41Fm'$
$+Kc'FmR1D1A1'B1KaT40$
$+Kc'FmR1D1A1B1'Ka'T40$
$+Kc'FmI2D1'T40A1B1Ka+FmI2D1'T32B1'$ $0jo=Td+InT41M5D2D1'+A1B1'I3D5D4D3R43'$
$+JoB1'T41I3D5D4D3R43'$ $mw1$ Write:

$1mw1=L1M6LmT1'+B1M6MtmT1'+I1$ $0mw1=L1'M6Lm+B1'M6Mtm+M6Ka'D3T1$ $i1$:

$1i1=I1'K41+Td$ $0i1=N11+InD5'D4T41+InD5'Ko$ $i2$:

$1i2=N1'Go'I2'I1'K41+IcDoKo+Td+IqK41GoR43$
$+FaNz'I2'KoEc'$ $0i2=NR3KoD4'+I1'GoK41+N1K41+IqT40$
$+HoT41I2+I2MoKo+FaEcKo$ $i3a$:

$1i3a=N11D2+U1D52T1+N11D6D4D3$ $0i3a=K41+Td$ $i4$:

$1i4=Td+I1DoK41+I3D6'D53Ko$ $0i4=I4K41$ $mw2$ Write:

$1mw2=L1'M6Lm+B1'M6Mtm+T1$ $0mw2=L1M6LmT1'+B1M6MtmT1'$ $CLO=I4I1$
$D10=DoKd$
$D42=D4D2'$
$D52=D5'D2$
$D53=D5'D3$
$Ho=I1'DoI3a'$
$Ia=I4I2'I1'$
$Ic=I4'I2'I1$
$In=I4'I2I1$
$Io=I4I2I1'$
$Iq=I4I1$
$Ix=I2I1N5R42$
$I2d=12D5'D3'$
$I3=I4'I1'Do'I3a'$
$Ko=Kc'T41$
$K41=KcT41$
$Lm=D3D1'$
$Ltm=KaD3D1$
$Mo=I3aD5D4D3'$
$Moo=I3aD5D4D3T41'$
$M1=I3aD5D4'D3'$
$M2=I3aD5D4'D3$
$M5=D6D5'D4D3'$
$M6=I2'I1'DoD4'D2'$
$M7=D4D3'D2'D1$
$Msd=D6D4'D3'D1I3a$
$MsL=D4'D3I3aC4'$
$Msr=D4'D3'D1I3aI2'$
$Mtm=Ka'D3D1$
$N6=I4N5I1'$
$N7=I4'N5$
$N10=D4'D2'$
$N11=I2I1DoT41$
$NR1=R42D6'I1'Fm'$
$NR3=I4'I1'$
$NR8=D6'D5'D3D1C6$
$NR13=P5P4P3P1SKa'I2$
$NR51=TT41$
$NR50=I3aD5D4D3'Fm'$
$OD=I4I2I1'S'Ka'$
$Pm=I4I2'I1'S$
$Roo=A1'R1'C4'$
$Ro1=A1'R1$
$R10=A1R1'$
$Soo=A1'B1'C4'$
$S11=A1B1R1I3a$
$T33=P6P5'P3P2P1'$
$T32=P6P5'P4'P3P2$
$T31=FmI2P6P5P4'P3'D3$
$T2=P6'P5'P3'P2'P1$
$T8=P6'P4'P3P1'Ka'Go$
$T13=P5'P3P2P1'$
$T14=P5P4P3$
$T20=P5P4P3'P1'$
$T21=T41'P5P4'P3'P2'$
$T22=P6P5'P3'P2'P1$
$T28=P6P4'P3P1'Ka'Go'$
$T40=P6P5P4P3'P1'$
$Tn=Tp'Tr'Tfp'Tfr'$
$T=Tp+Tr+Tfp+Tfr$
$Te=I1'C6Fm'$
$Tp$=Tape is being punched
$Tr$=Tape is being read
$Tfp$=Tape is being punched on auxiliary punch
$Tfr$=Tape is being read on auxiliary reader
$U1=I4'I2I1'Do'$
$Ui=I4'I2'I1'$
$Ws=I4'I1'D4'D3D2'Do'$
$CLO=I4I1$ Turns "compute" light off
$Jo'$=Overflow light
$D6'$–$D1'$=Channel lights 6 to 1
$C6'$–$C1'$=Sector lights 6 to 1
$R43'$=Half-word light Compute switch signals:
- Halt: Both H and C' signals present
- Compute: H' only
- Single cycle: H' and C' signals present Conditions of $C2$, $C3$, $C4$ for input and output:
- Electric typewriter keyboard input and output—$C4'C3'C2'$
- Electric typewriter punch—$C4'C3'C2$
- Electric typewriter reader—$C4'C3'C2$
- Auxiliary reader and punch—$C4'C3C2'$
- Option—$C4'C3C2$
- Card reader and punch—$C4C3'C2'$
- Automatic—program Although the invention has been described and illustrated in detail, it is to be clearly understood that the same is by way of illustration and example only and is not to be taken by way of limitation, the spirit and scope of this invention being limited only by the terms of the appended claims.

I claim:

1. In an electronic computer, means providing floating point multiplication of one operand with another in a plurality of computer word times including an initial computer word time, each of said operands having an exponent portion and a fraction portion, said exponent portion indicating a power of 2 by which said fraction portion must be multiplied to obtain the numerical valve of the operand represented by said exponent and fraction portions, one of said operands being a multiplier and the other of said operands being a multiplicand, said means providing floating point multiplication comprising means for serially by bit multiplying the fraction portion of said multiplicand by the fraction portion of said multiplier, said means providing floating point multiplication further comprising means for serially by bit adding the exponent portions of said multiplier and said multiplicand during an initial computer word time of the floating point multiplication.

2. In an electronic digital computer, means providing floating point multiplication of one operand with another, each of said operands having an exponent portion and a fraction portion; said multiplication yielding a product; means for copying a first operand into a first register and for copying a second operand into a second register; means for controlling said floating point multiplication including means for indicating completion of said operations; means for copying said operands to a proper register for executing said multiplication; first means for determining the sign of the product and for storing said sign; means for combining said exponent portions into one exponent; second means for determining if either fraction operand is zero and including means for terminating said operations if either operand is zero; means for converting to fixed point multiplication for multiplying said fraction portions, means for providing an answer operand comprised of said stored sign, said combined exponent portions and said multiplied fraction portions, and means for terminating said floating point multiplication.

3. The combination as recited in claim 2 wherein said means for controlling said floating point multiplication comprises a third register set to the number of word times required for said digital computer to complete the multiplication, said third register being comprised of an operable combination of flip-flops and memory storage locations including logic gates for connecting said flip-flops and storage locations as required to provide counting down of said third register by one per word time of multiplication.

4. The combination as recited in claim 2 wherein said means for controlling said floating point multiplication comprises a third register set to the number of word times required for said digital computer to complete the multiplication, said third register being comprised of an operable combination of flip-flops and memory storage locations including logic gates for connecting said flip-flops and storage locations as required to provide counting down of said third register by one per word time of multiplication, and wherein said means for copying said operands includes a fourth register and gating means for shifting said first operand from said first register to said fourth register during floating point multiplication operation including gating means for zero setting said first register and for recirculating said second register.

5. The combination as recited in claim 2 wherein said means for combining said exponent portions comprises addition logic gates and flip-flops for adding the exponents during the floating point multiplication operation.

6. The combination as recited in claim 2 wherein one of said operands is a multiplier operand and the other of said operands is a multiplicand operand said means for converting to fixed point multiplication for multiplying said fraction portions comprises means for successively multiplying the fraction portion of said multiplicand by each digit of the fraction portion of said multiplier, said multiplicand fraction portion being copied into said first register as a partial product when said multiplier digit is a one, and said partial product being added to zero when said multiplier digit is a zero, said means including means for right shifting the partial product of each multiplication by one digit and adding the result of each multiplication to the result of the previous multiplication after said shifting, said successive multiplications continuing until a final product is obtained; and means for combining the exponent and the final product into said first register.

7. In an electronic digital computer, means providing floating point multiplication of one operand with another, each of said operands having an exponent portion and a fraction portion; said fraction portion and said exponent portion being comprised of digits and having a negative or positive sign associated with each respective portion; one of said operands being a multiplier and the other of said operands being a multiplicand; said multiplication yielding a product; means for copying one operand into a first register and for copying the other operand into a second register; means for controlling said floating point multiplication including means for indicating completion of said operations; means for copying said operands to a proper register for executing said multiplication; means for determining the sign of the product and for storing said sign; means for combining said exponent portions into one exponent; said means for combining said exponent portions comprising addition logic gates and flip-flops for adding the exponents during the floating multiply operation; means for determining if either fraction operand is zero and including means for terminating said operations if either operand is zero; means for converting from floating point multiplication to fixed point multiplication including means for executing to completion said floating point multiplication including said fixed point multiplication, said means for executing to completion comprising means for successively multiplying the fraction portion of said multiplicand by each digit of the fraction portion of said multiplier, said means for executing to completion further comprising means for successively multiplying said multiplicand by each digit of said multiplier, said multiplicand being copied into said first register as a partial product when said multiplier digit is a one, and said partial product being added to zero when said multiplier digit is a zero, said means successively multiplying including means for right shifting the partial product of each multiplication by one digit and adding the result of each multiplication to the result of the previous multiplication after said shifting, said successive multiplications continuing until a final product is obtained; means for combining the exponent and the final product into said first register, and means for terminating said multiplication.

8. In an electronic digital computer, means providing floating point multiplication of one operand with another, said multiplication yielding a product, each of said operands having a sign associated with said operand, an exponent portion indicating a power to which the number 2 is taken, the numerical value indicated by said exponent portion being biased so said exponent portion is capable of indicating either positive or negative exponents, and a fraction portion; first register means for containing the multiplier operand, second register means for containing the multiplicand operand, third register means for counting word times for terminating the floating point operation after a final product has been obtained; a fourth register; means for shifting said multiplier operand from said first register to said fourth register and for clearing to zero of said first register; means for determining and storing the sign of said multiplication product, means for serially adding said exponent portions of said operands and for copying the sum thereof into said second register; means for detecting possible exponent overflow or underflow, as the case may be, as a result of said addition of exponents and for setting the overflow indicator; means for terminating said floating multiply operation if either the multiplier or the multiplicand is zero, including means for clearing said first register to all zeros if either of said multiplier or multiplicand is zero; means for recirculating said second register for preserving said multiplier operand therein; means for executing successive multiplications of the multiplicand by each bit of the multiplier, each of said successive multiplications producing a partial product and a reduced multiplier, said multiplications being executed by successive additions of the multiplicand to the partial product, said multiplicand being added to the partial product if the multiplier bit is one and not being added if the multiplier bit is zero; means for right shifting the result of each successive addition by one bit including means for accumulating said partial products in said first and fourth registers until a final product is obtained; means for copying said exponent from said second register into said first register, means for inserting the sign of said product into said first register, means for determining if said final product is normalized; means for terminating said floating multiply operation if said product is normalized, said left shifting continuing until said product becomes normalized; means for subtracting a binary number one from said exponent for each bit of said left shift; and means for terminating said floating point multiplication after normalization.

References Cited by the Examiner

UNITED STATES PATENTS

| | | | |
|---|---|---|---|
| 2,928,076 | 3/1960 | Greene | 235—167 |
| 3,012,723 | 12/1961 | Goertzel et al. | 235—167 |
| 3,037,701 | 6/1962 | Sierra | 235—159 |
| 3,043,509 | 7/1962 | Brown et al. | 235—156 |
| 3,131,293 | 4/1964 | Bush et al. | 235—159 |
| 3,210,737 | 10/1965 | Perry et al. | 235—159 |

ROBERT C. BAILEY, *Primary Examiner.*

MALCOLM A. MORRISON, *Examiner.*

J. P. VANDENBURG, *Assistant Examiner.*